United States Patent
Diamantopoulos et al.

(10) Patent No.: US 11,783,200 B2
(45) Date of Patent: Oct. 10, 2023

(54) ARTIFICIAL NEURAL NETWORK IMPLEMENTATION IN FIELD-PROGRAMMABLE GATE ARRAYS

(71) Applicant: International Business Machines Corporation, Armonk, NY (US)

(72) Inventors: Dionysios Diamantopoulos, Thalwil (CH); Heiner Giefers, Langnau am Albis (CH); Christoph Hagleitner, Wallisellen (CH)

(73) Assignee: International Business Machines Corporation, Armonk, NY (US)

( * ) Notice: Subject to any disclaimer, the term of this patent is extended or adjusted under 35 U.S.C. 154(b) by 1237 days.

(21) Appl. No.: 16/270,778

(22) Filed: Feb. 8, 2019

(65) Prior Publication Data
US 2020/0257986 A1    Aug. 13, 2020

(51) Int. Cl.
*G06N 3/04*    (2023.01)
*G06N 3/10*    (2006.01)
*G06N 3/08*    (2023.01)

(52) U.S. Cl.
CPC ............ *G06N 3/10* (2013.01); *G06N 3/04* (2013.01); *G06N 3/08* (2013.01)

(58) Field of Classification Search
CPC .................................................. G06N 3/02–049
USPC ...................................................... 706/15–44
See application file for complete search history.

(56) References Cited

U.S. PATENT DOCUMENTS

| 6,144,977 | A | 11/2000 | Giangarra et al. |
| 6,507,860 | B1 | 1/2003 | Verma et al. |
| 2016/0379115 | A1 | 12/2016 | Burger et al. |

| 2019/0042909 | A1* | 2/2019 | Sumbul ............... G06N 3/08 |
| 2019/0050710 | A1* | 2/2019 | Wang ................ G06N 3/084 |
| 2019/0180177 | A1* | 6/2019 | Yim .................... G06N 3/08 |

(Continued)

FOREIGN PATENT DOCUMENTS

| CN | 107239829 A | 10/2017 |
| CN | 107704916 A | 2/2018 |
| CN | 108090560 A | 5/2018 |

(Continued)

OTHER PUBLICATIONS

Shen et al. "Towards a Uniform Template-based Architecture for Accelerating 2D and 3D CNNs on FPGA", Feb. 2018, FPGA ' 18.*

(Continued)

*Primary Examiner* — Jue Louie

(74) *Attorney, Agent, or Firm* — Scully, Scott, Murphy & Presser, P.C.; Daniel P. Morris

(57) ABSTRACT

Field-programmable gate array and method to implement an artificial neural network. A trained model of the neural network is processed, in which weights are defined in a floating-point format, to quantize each set of weights to a respective reduced-precision format in dependence on effect of quantization on accuracy of the model. For each set of weights, a partitioning scheme is defined for a set of block memories of the apparatus such that a plurality k of those weights can be stored in each addressable location of the set of memories, wherein k differs for different sets of weights. The apparatus can be programmed to implement the neural network such that weights in each set are persistently stored in a set of block memories partitioned according to the partitioning scheme for that set of weights.

17 Claims, 7 Drawing Sheets

(56) References Cited

U.S. PATENT DOCUMENTS

2020/0042287 A1* 2/2020 Chalamalasetti ....... G06F 7/483

FOREIGN PATENT DOCUMENTS

| CN | 108280514 A | 7/2018 |
|---|---|---|
| WO | 2016/182671 A1 | 11/2016 |

OTHER PUBLICATIONS

Zhang et al. "DNNBuilder: an Automated Tool for Building High-Performance DNN Hardware Accelerators for FPGAs", Nov. 2018, 'ICCAD'18.*

Blott et al. "FINN-R: An End-to-End Deep-Learning Framework for Fast Exploration of Quantized Neural Networks", Dec. 2018, ACM Transactions on Reconfigurable Technology and Systems, vol. 11, No. 3, Article 16.*

Zhou et al. "Adaptive Quantization for Deep Neural Network", 2018, The Thirty-Second AAAI Conference on Artificial Intelligence.*

Donato et al. "On-Chip Deep Neural Network Storage with Multi-Level eNVM", Jun. 2018, DAC '18: Proceedings of the 55th Annual Design Automation Conference.*

Simonyan, K., et al., "Very Deep Convolutional Networks for Large-Scale Image Recognition", Published as a conference paper at ICLR 2015, arXiv:1409.1556v6, Apr. 10, 2015, pp. 1-14.

Guo, K., et al., "[DL] A Survey of FPGA-Based Neural Network Accelerator", arXiv:1712.08934v3, Dec. 6, 2018, ACM Transactions on Reconfigurable Technology and Systems, Dec. 2017, pp. 11:1-11:26, vol. 9, No. 4, Article 11.

NVIDIA, "NVDIA Tesla P100: The World's First AI Supercomputing Data Center GPU", http://www.nvidia.com/object/tesla-p100.html, Accessed on Jan. 25, 2019, 5 pages.

Jouppi, N.P., et al., "In-Datacenter Performance Analysis of a Tensor Processing Unit", Retrieved Nov. 17, 2017, pp. 1-17.

Caulfield, A.M., et al., "A Cloud-Scale Acceleration Architecture", 2016 49th Annual IEEE/ACM International Symposium on Microarchitecture (MICRO), Oct. 15-19, 2016, 13 pages.

Chung, E., "FPGA' 18 Panel", http://www.isfpga.org/fpga2018/slides/FPGA18_Panel_Talk_Eric_Chung.pdf, Accessed on Feb. 6, 2019, 9 pages.

Courbariaux, M., et al., "BinaryConnect: Training Deep Neural Networks with binary weights during propagations," in Advances in Neural Information Processing Systems 28: Annual Conference on Neural Information Processing Systems 2015, Dec. 7-12, 2015, pp. 3123-3131.

Courbariaux, M., et al., "BinaryNet: Training Deep Neural Networks with Weights and Activations Constrained to +1 or −1", arXiv:1602.02830v1, Feb. 9, 2016, 9 pages.

Rastegari, M., et al., "Xnor-net: Imagenet Classification Using Binary Convolutional Neural Networks," arXiv:1603.05279v4, Aug. 2, 2016, pp. 1-17.

* cited by examiner

```
inline float DotVecToVec126(float source[NUMBER_OF_INPUTS],
                            float weights[NUMBER_OF_INPUTS]) {
    float output = 0.0;
    for(unsigned int i = 0; i < NUMBER_OF_INPUTS; i++)
        output += source[i] * weights[i];
    return output;
}
```

```
const int opt_fctr = 9; // partition and unrolling optimization
inline ap_fixed<17,7> DotVecToVec126_transp(
                    ap_fixed<8,4> source[NUMBER_OF_INPUTS],
                    ap_fixed<5,1> weights1[NUMBER_OF_INPUTS-K],
                    ap_fixed<8,2> weights2[K]) {
#pragma HLS INLINE
#pragma HLS ARRAY_RESHAPE variable=source cyclic factor=opt_fctr
#pragma HLS ARRAY_RESHAPE variable=weights cyclic factor=opt_fctr
#pragma HLS RESOURCE variable=source core=RAM_2P_BRAM
#pragma HLS RESOURCE variable=weights1 core=ROM_2P_BRAM
#pragma HLS RESOURCE variable=weights2 core=ROM_nP_LUTRAM
    ap_fixed<17,7> output = 0.0;
    for(ap_uint<7> i = 0; i < NUMBER_OF_INPUTS; i++) {
#pragma HLS PIPELINE rewind
#pragma HLS UNROLL factor=opt_fctr
        output += (ap_fixed<17,7>)(source[i] *
                                   weightsTr(i, weights1, weights2));
    }
    return output;
}
```

Figure 17

ARTIFICIAL NEURAL NETWORK IMPLEMENTATION IN FIELD-PROGRAMMABLE GATE ARRAYS

BACKGROUND

The present disclosure relates generally to implementation of artificial neural networks in field-programmable gate arrays. Methods are provided for configuring field-programmable gate array apparatus to implement artificial neural networks, together with apparatus configured by such methods.

Artificial neural networks (ANNs) have been developed to perform computational tasks in a manner inspired by biological architectures of the nervous system. These networks are based on a principle of biological systems whereby neurons are interconnected via synapses which relay weighted signals between the neurons. ANNS are based on a logical construction in which a succession of layers of neurons are interconnected so that output signals of neurons in one layer are weighted and transmitted to neurons in the next layer. A neuron $N_i$ in a given layer may be connected to one or more neurons $N_j$ in the next layer, and different weights $w_{ij}$ can be associated with each neuron-neuron connection $N_i$-$N_j$ for weighting signals transmitted from $N_i$ to $N_j$. A neuron $N_j$ generates output signals dependent on its accumulated inputs, whereby weighted signals can be propagated over successive layers of the network from an input to an output neuron layer.

ANN-based machine learning models have been successfully applied in various complex analysis tasks such as speech and image recognition, e.g. classification of handwritten digits. Such a network model undergoes a training phase in which the sets of weights associated with respective neuron layers are determined. The network is exposed to a set of training data, e.g. image data for hand-written digits, in an iterative training scheme in which the weights are repeatedly updated as the network "learns" from the training data. The resulting trained model, with weights defined via the training operation, can then be applied to perform tasks based on new (unseen) data for the application in question.

ANNs have enabled major advances in machine learning and AI (artificial intelligence) generally. However, the performance requirements of modern ANNs make it challenging to implement these networks in a commercial landscape. ANNs are heavily constrained by latency, cost, and power, while their size and complexity outpace the growth of commodity CPUs (central processing units). Recent ANN models require up to tens of billions of floating-point operations (BFLOP) and more than 500 megabytes for storage of weights, making it challenging to meet the necessary performance requirements. ANN implementations typically employ powerful processing systems using multi-core CPUs together with accelerators such as graphics processing units (GPUs), application specific integrated circuits (ASICs) or field-programmable gate arrays (FPGAs). FPGAs offer reconfigurable logic, comprising multiple logic blocks which can be configured to implement required compute functionality, along with memory elements comprising both registers, which provide a few bits of RAM (random access memory), and larger, dedicated blocks of memory ("block memories" or "Block RAMs"). FPGA registers (also called "LUTs" (lookup tables)) can be combined and configured as larger units of memory (distributed RAM or "LUTRAM"). Both block memories and distributed RAM can be initialized with data at runtime or configured as ROM (read-only memory) for persistent storage of data.

SUMMARY

According to at least one embodiment of the present invention there is provided a method for configuring field-programmable gate array apparatus to implement an artificial neural network having a succession of interconnected neuron layers and a plurality of sets of weights, each associated with a respective neuron layer, for weighting output signals of those neuron layers. The method includes processing a trained model of the neural network, in which the weights are defined in a floating-point format, to quantize each set of weights to a respective reduced-precision format in dependence on effect of the quantization on accuracy of the model. The method also includes, for each set of weights, defining a partitioning scheme for a set of block memories of the apparatus such that a plurality k of those weights can be stored in each addressable location of the set of memories, wherein k differs for (at least some of the) different sets of weights. The method further comprises programming the apparatus to implement the neural network such that weights in each set are persistently stored in a set of block memories partitioned according to the partitioning scheme for that set of weights.

At least one additional embodiment of the invention provides a computer program product comprising a computer readable storage medium embodying program instructions, executable by a computing system, to cause the computing system to perform a method for configuring FPGA apparatus as described above.

At least one further embodiment of the invention provides field-programmable gate array apparatus comprising logic configured to implement an artificial neural network having a succession of interconnected neuron layers and a plurality of sets of weights, each associated with a respective neuron layer, for weighting output signals of those neuron layers. The logic is configured to process each set of weights in dependence on a respective data format defined for that set. For each set of weights, the logic includes a set of block memories partitioned according to a partitioning scheme for that set of weights such that a plurality k of those weights are persistently stored in each addressable location of the set of memories, wherein k differs for (at least some of the) different sets of weights.

Embodiments of the invention will be described in more detail below, by way of illustrative and non-limiting example, with reference to the accompanying drawings.

BRIEF DESCRIPTION OF THE SEVERAL VIEWS OF THE DRAWINGS

FIG. 17 shows a portion of an ANN programming model annotated with directives corresponding to outputs of the FIG. 16 system in an embodiment.

DETAILED DESCRIPTION

Figure 1:
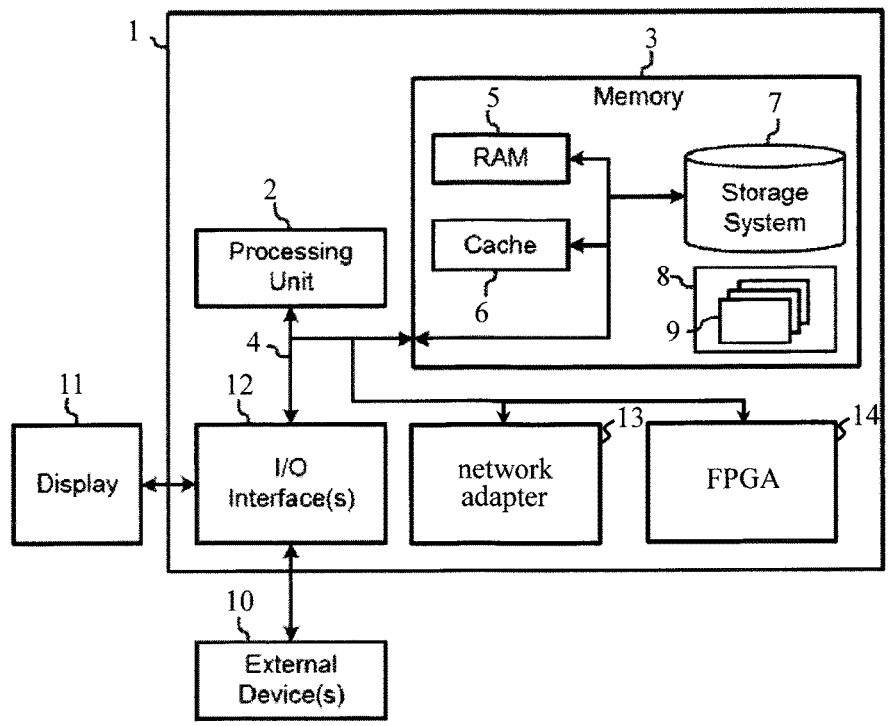
FIG. 1 is a schematic representation of a computing system for implementing FPGA configuration methods embodying the invention in one embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Methods embodying the invention may be performed as computer-implemented methods for configuring FPGA apparatus to implement an ANN. Such methods may be implemented by a computing system comprising one or more general- or special-purpose computers, each of which may comprise one or more (real or virtual) machines, providing functionality for implementing operations described herein. Steps of methods embodying the invention may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

FIG. 1 is a block diagram of exemplary computing apparatus for implementing an FPGA configuration method in an embodiment of the invention. The computing apparatus is shown in the form of a general-purpose computer 1. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 can also communicate with FPGA apparatus, comprising one or more FPGAs 14, for implementing embodiments of the invention. In general, an FPGA 14 may be internal or external to computer 1. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
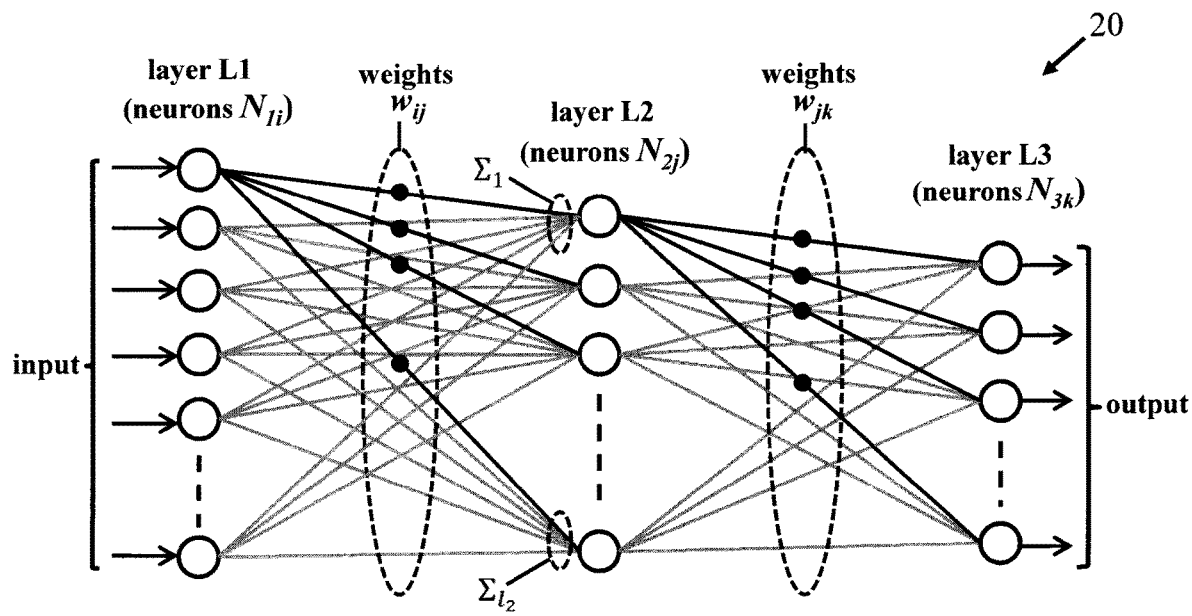
FIG. 2 is a schematic representation of an exemplary ANN in one embodiment.
Figure 3:
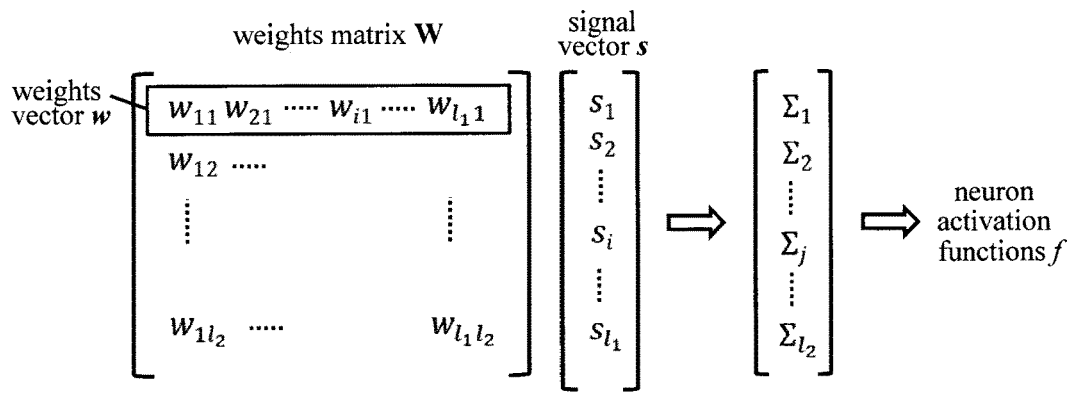
FIG. 3 illustrates a matrix-vector computation stage for a neuron layer of the FIG. 2 ANN in one embodiment.

FIG. 2 illustrates logical structure of an exemplary ANN. The ANN 20 comprises a succession of interconnected layers of neurons. In the simple example shown, the network has three neuron layers: a layer L1 of input neurons which receive the input data signals; a layer L3 of output neurons which provide the output signals of the network, and an intermediate ("hidden") layer L2 of neurons between the input and output layers. Neurons in layer L1 are denoted here by $N_{1i}$ ($1 \leq i \leq l_1$), neurons in layer L2 are denoted by $N_{2j}$ ($1 \leq j \leq l_2$), and neurons in output layer L3 are denoted by $N_{3k}$ ($1 \leq k \leq l_3$), where $l_x$ is the number of neurons in layer Lx. Neurons in each layer are connected to neurons in the next layer as indicated, whereby neuron output signals from one layer are transmitted to neurons in the next layer. Neuron layers L1 and L2 have associated sets of weights for weighting the output signals of those neuron layers. A weight $w_{ij}$ is defined for each connection between an L1 neuron $N_{1i}$ and an L2 neuron $N_{2j}$, whereby a signal transmitted from $N_{1i}$ to $N_{2j}$ is weighted according to the corresponding weight $w_{ij}$ for that neuron pair. Similarly, a signal output by a layer L2 neuron $N_{2j}$ to a layer L3 neuron $N_{3k}$ is weighted by the corresponding weight $w_{jk}$. Input layer neurons may simply transmit their received input data signals as the output signals for layer L1. For subsequent layers L2 and L3, each neuron $N_{2j}$, $N_{3k}$ generates an output signal dependent on its accumulated inputs, i.e. the accumulated weighted output signals from its connected neurons in the previous layer. Each neuron applies a predetermined "activation function" $f$ to the result $\Sigma$ of this accumulation operation to generate its neuron output signal for transmission to the next layer. A computation stage required for each neuron layer can thus be represented by a matrix-vector multiplication as indicated in FIG. 3. Here, the L1 neuron output signals are represented by a vector s of output signals $s_i$ of respective neurons $N_{1i}$, and the set of weights is represented by a matrix W of the weights $w_{ij}$. The accumulated weighted output $\Sigma_j$ transmitted to a neuron $N_{2j}$ is given by a dot product computation s·w where w is a vector of weights connecting L1 neurons to $N_{2j}$. That is, $\Sigma_j = s \cdot w = \Sigma_{i=1}^{l_1} (s_i \times w_{ij})$. The entire matrix-vector computation comprises $l_2$ of these dot product calculations to obtain the vector of inputs $\Sigma_1, \Sigma_2 \ldots \Sigma_{l_2}$ to respective neurons $N_{2j}$. Each neuron $N_{2j}$ then calculates $f(\Sigma_j)$ to generate its neuron output signal $s_j$ for layer L2.

While a simple example of a fully-connected network is shown in FIG. 1, in general a neuron in any given layer may be connected to one or more neurons in the next layer, and networks may include one or more (commonly up to 30 or more) successive layers of hidden neurons. Some networks, e.g. convolutional neural networks, may have three-dimensional neuron layers with associated three-dimensional weight arrays, with correspondingly increased computational complexity. Neuron layers may include one or more bias neurons (not shown) which do not receive input signals but transmit predetermined bias signals to the next neuron layer. Additional computation stages may also be associated with neuron layers in some networks. However, dot product calculations generally as described above are fundamental to all types of ANN, whether in vector-vector, matrix-vector or matrix-matrix computation stages.

ANN models can be generated and trained in known manner using a variety of modelling and machine learning techniques. A trained ANN can be defined by a programming model, such as a C programming model, defining the various computations performed by the network. Such a model thus defines the various neuron layers, e.g., numbers of neurons, activation functions, interconnection patterns, etc., and the sets of (trained) weights associated with respective neuron layers. The model can be used to configure a hardware implementation of the ANN as indicated schematically in FIG. 4. Given a trained ANN program model, various high-level synthesis (HLS) tools, such as the Xilinx Vivado HLS software suite, can be used to generate an RTL (register-transfer level) design from the model. The RTL implementation can then be synthesized to gate level for programming the hardware implementation in an FPGA 30. The FPGA 30 comprises logic which can be configured by programming to implement a required hardware design. The FPGA logic comprises memory 31 and compute logic comprising an array of programmable logic blocks 32 and a hierarchy of configurable interconnects 33. Memory 31 comprises an array of block memories (BRAMs) 34, as well as distributed RAM (LUTRAM) 35 which can be configured from registers, e.g. LUTs in logic blocks 32. Logic blocks 32 and memory elements 34, 35 can be interconnected and configured by programming to perform any desired computational functionality.

An FPGA 30 configured for ANN implementation can then be used for ANN inference, processing input data received from a host CPU to generate the ANN outputs for that data. During inference, ANN weights may be supplied dynamically at runtime from host DRAM (dynamic RAM) along with the input data to be processed. Alternatively, weights may be persistently stored in FPGA memory 31 where memory resources allow. In embodiments described below, ANN weights are persistently stored in FPGA memory 31.

Figure 4:
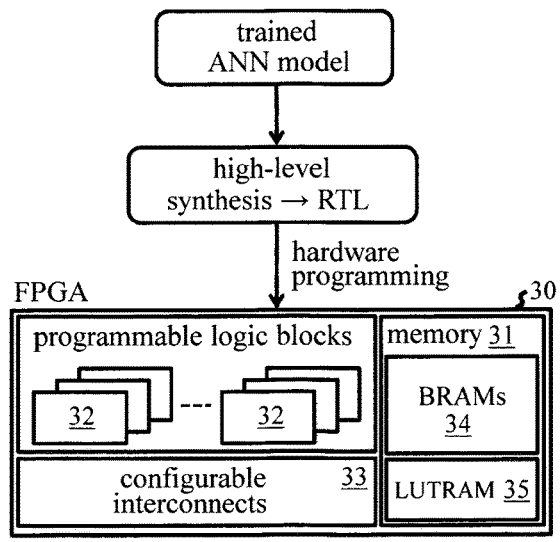
FIG. 4 illustrates a process for configuring an FPGA to implement an ANN in one embodiment.

An FPGA 30 may include various additional components not shown in FIG. 4, such as I/O logic for host CPU/memory interfaces, clock and timing control circuitry, and embedded microprocessors for various control functions. While a single FPGA is shown in FIG. 4, in general an ANN may be implemented by FPGA apparatus comprising one or more FPGAs. An ANN implemented by FPGA apparatus may also be a component sub-network of a larger, more complex neural network.

Figure 5:
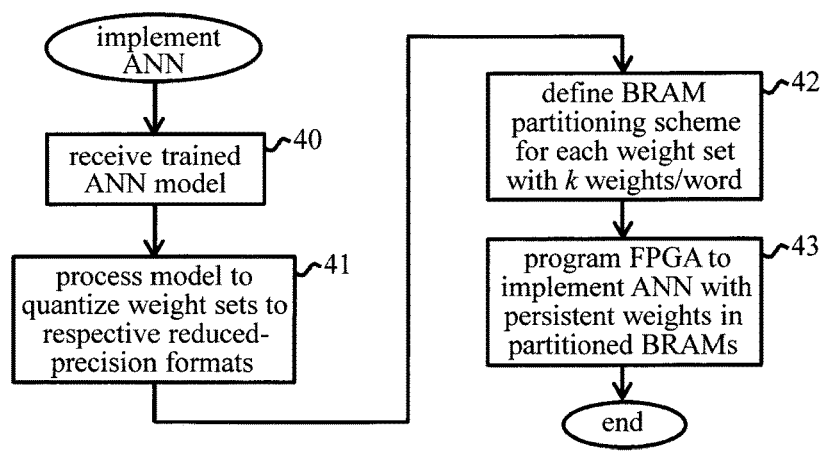
FIG. 5 indicates steps of a method embodying the invention for configuring FPGA apparatus to implement an ANN in one embodiment.

FIG. 5 indicates basic steps of a method for configuring FPGA apparatus to implement an ANN embodying the invention. In step 40, a trained ANN model, e.g. a C programming model, is stored in a computing system 1. Such a model defines the ANN weights in a high-precision, floating-point format, typically as single precision (32-bit) or double precision (64-bit floating-point numbers). In step 41, system 1 processes the set of weights associated with each individual neuron layer to quantize that set of weights to a respective reduced-precision format. The reduced-precision data format for a given weight set is determined in dependence on effect of the quantization on accuracy of the model. This can be assessed by simulation of the model, using standard simulation tools, to determine, for instance, a percentage degradation in accuracy. Increased quantization tends to reduce model accuracy due to loss of precision in the weights, but loss of precision in different neuron layers may have different effects on overall model accuracy. For each layer, weight quantization may be performed as a progressive process, evaluating the effect on accuracy of each quantization step, such that overall precision is maintained at a level required for a given application. For example, each layer's weights may be quantized up to a threshold precision defined for that layer in dependence on contribution of that layer to overall precision of the model. As a further example, each set of weights may be quantized up to threshold accuracy degradation, e.g. percentage accuracy loss, for the model as a whole. The resulting reduced-precision formats for quantizing the various weight sets are stored in system 1 in step 41.

In step 42, for each set of weights, a partitioning scheme for a set of BRAMs 34 of FPGA 30 is defined in system 1. The partitioning scheme for each weight set is such that a plurality k of those weights can be stored in each addressable location of the set of BRAMs. This corresponds to a horizontal partitioning of BRAM storage blocks (words) whereby k concatenated weights make up a word at each BRAM address. The BRAM partitioning scheme is defined on a per-layer basis, and can thus vary according to the weight quantization for each layer, whereby the number k of weights per horizontally-partitioned BRAM address differs for at least some of the different sets of weights in the network. The value of k for each weight-set's partitioning scheme (along with any other parameters of the partitioning scheme discussed below) is stored in system 1 in step 42.

In step 43, system 1 programs FPGA 30 to implement the ANN, generally as described for FIG. 4 above. The program model, and additional configuration parameters defined in steps 41 and 42, are thus processed via HLS tools to configure the FPGA accordingly. The required configuration parameters may be defined here via directives, or "pragmas", added to the program model as discussed further below. In the FPGA programming step, weights in the weight-set for each layer are persistently stored in a set of BRAMs 34 which are partitioned according to the partitioning scheme defined in step 42. While all weights may be stored in BRAMS in some embodiments, some embodiments described below store only a subset of each layer's weights in the partitioned BRAMS in this step.

The above method provides high-density storage of reduced-precision ANN weights, quantized on a per-layer basis, in appropriately partitioned BRAMs, allowing persistent storage of all weights in FPGA memory for the lifetime of an ANN implementation. The weight quantization and partitioning can be varied as required across ANN layers, providing "transprecision" memory for ANN weight storage, enabling highly-efficient resource utilization. Persistent storage of weights is achievable even for complex networks, while optimizing the transprecision memory and weights to maintain operational accuracy. High-performance persistent ANNs, in which host/FPGA memory bandwidth is used only for ANN input data at runtime, are therefore achievable even for complex neural networks.

Figures 6, 7:
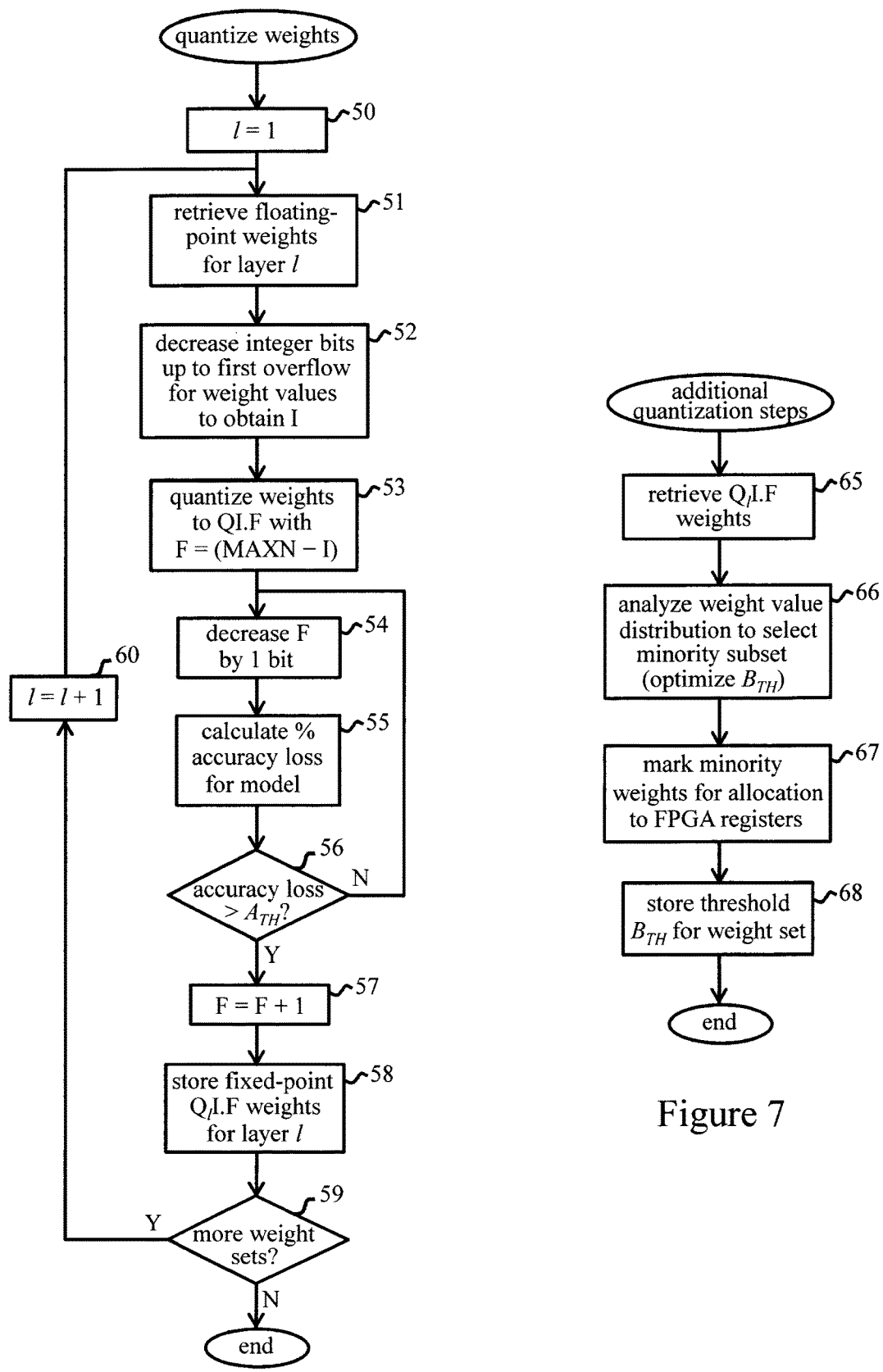
FIG. 6 indicates a weight quantization operation of FIG. 4 in more detail for an embodiment of the invention.
FIG. 7 indicates additional steps of the weight quantization operation in one embodiment.

FIG. 6 shows exemplary steps of the weight-quantization process (step 41 of FIG. 5) in more detail. In this example, each set of weights (initially stored as full-precision twos-complement integer values) is quantized to a respective n-bit fixed-point format, denoted by QI·F, where I is the number of integer bits, F is the number of fractional bits, and the bit-width n ($=I+F$)$\leq$MAXN=floor($\log_2$(FLT_MAX)), where FLT_MAX represents the maximum representable number in a floating point format (e.g. for single precision FLT_MAX=3.402823e+38). In step 50, a layer counter l is initialized to 1 for the first weight set. In step 51, the full-precision weights of this set are retrieved from memory of computing system 1. In step 52, system 1 gradually decreases the number I of integer bits (from a predetermined maximum possible I value equal to MAXN, e.g. 128 for single precision) up to the first overflow for a weight value in that set. The value of I is thus determined as the minimum number of integer bits needed to express all (integer bits of) values in the set without overflow. In step 53, all weights are quantized to a number F=(MAXN−I) of fractional bits. Excess fractional bits may simply be dropped, or some form of rounding (e.g. rounding to the nearest value, stochastic rounding, etc.) may be employed here. In step 54, F is decreased to (F−1), and the percentage accuracy loss of the model simulated with the resulting quantized weights is determined in step 55. In decision step 56, the system decides if the resulting accuracy loss exceeds a predetermined threshold $A_{TH}$ for accuracy degradation. If not, ("No" (N) at decision 56), operation reverts to step 54. Steps 54 and 55 are thus repeated, and F progressively reduced, until the accuracy loss exceeds $A_{TH}$ ("Yes" (Y) at decision step 56). The number of fractional bits is then set to F=F+1 in step 57, and the weights for the current layer-l are stored in the resulting format $Q_lI \cdot F$ in step 58. Decision step 59 determines if further weight sets remain to be processed. If so, the layer counter l is incremented in step 60, and operation reverts to step 51 for the next set. When all weight sets have been processed, operation terminates at decision step 59.

The FIG. 6 process thus determines a respective fixed-point format $Q_lI \cdot F$ for each set of weights by providing sufficient integer bits I to accommodate integer bits of all of those weights without overflow, and then progressively rounding fractional bits of the weights up to the accuracy-loss threshold $A_{TH}$. The bit-width n for the fixed-point weight format is thus optimized at bit level on a layer by layer basis, with the smallest acceptable bit-width being adopted for each layer.

In embodiments, for each set of weights, the weight quantization process involves the additional steps indicated in FIG. 7. These steps may be performed between steps 58 and 59 of FIG. 6. In step 65 of FIG. 7, the system retrieves the $Q_lI \cdot F$-format weight set for a layer l. In step 66, the system analyzes the distribution of weight values in the set to select a minority subset of the weights whose values exceed a threshold bit-width $B_{TH}$ for that set. In particular, a small number (relative to the total number) of weights with "abnormal" values, i.e. values which require a larger number of bits to represent them than the majority of weight values, are selected as the minority subset. The weight distribution is thus analyzed to determine the threshold bit-width $B_{TH}$ for the weight set based on the bit-width required to represent most of the weight values, while excluding a few, longer bit-width values. These longer bit-width values would limit the number k of weights that can be stored in the partitioned BRAMs for the weight set. This would result in inefficient memory resource utilization because the majority of weight values need $\leq B_{TH}$ bits and so more of these values can fit in each BRAM address. To address this issue, in step 67 of FIG. 7, the system marks the minority subset of weights, whose values exceed $B_{TH}$-bits, for allocation to registers (LUTRAM 35) of FPGA 30. The threshold bit-width $B_{TH}$, representing the maximum bit-width of the remaining, majority subset of the weights, is then stored in step 68. This value will be used in step 42 of FIG. 5 to define the BRAM partitioning scheme for the weight set. When programming the FPGA in step 43 of FIG. 5, only weights in the majority subset are then stored in the partitioned BRAMs, and the minority subset of weights, marked in step 67 of FIG. 7, are stored in a set of registers of LUTRAM 35.

The threshold $B_{TH}$ can be determined in step 66 of FIG. 7 using an optimizer and can differ for different weight sets. A clustering optimization algorithm (e.g. a hierarchical clustering, k-means clustering, or expectation-maximization (EM) algorithm, etc.) may be employed for the optimizer here. The optimizer may take various factors into account in selecting $B_{TH}$, e.g. the number and distribution of weights; bit-width of the initial quantization format $Q_lI \cdot F$; the BRAM word-length; and memory resources of FPGA 30. The number k of weights/BRAM word is ideally as large as possible, while only a few, e.g. up to 10, weights per layer are selected for storage in registers based on the optimized threshold $B_{TH}$. Ideally, the BRAM word-length will be an exact multiple (or close to a multiple) of $B_{TH}$ for efficient usage of the available BRAM word-length. However, zero-padding can be employed for weight values requiring less than $B_{TH}$ bits.

Figure 8:
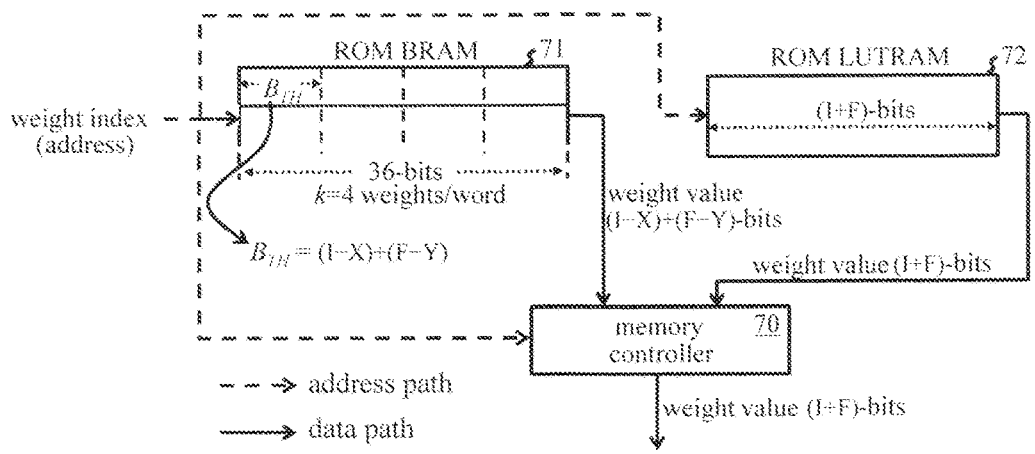
FIG. 8 illustrates configuration of memories in an FPGA programmed with quantized weights according to the FIG. 7 method in one embodiment.

The FIG. 7 process enables further compression of most of the weights in each layer, again at the bit-level, for exceptionally efficient use of FPGA memory resources. In effect, the majority of weights in a layer can be further quantized to a format $Q_lI(I-X) \cdot (F-Y)$, where $(I+F-X-Y)=B_{TH}$ for layer l. FIG. 8 illustrates the resulting memory structure for weights with a threshold $B_{TH}$=8-bits stored in a horizontally-partitioned BRAM with word-length 36 bits. A memory controller 70 acts as a wrapper to the weights memory 71, 72. Memory controller 70 selects output values from BRAM 71 or LUTRAM 72 according to the selective indexing scheme via which each weight index is selectively mapped to either a BRAM or LUTRAM address. Memory controller 70 can be configured in the FPGA logic using both HDL (hardware description language) programming with RTL tools and C-programming with HLS tools in generally known manner.

Figure 9:
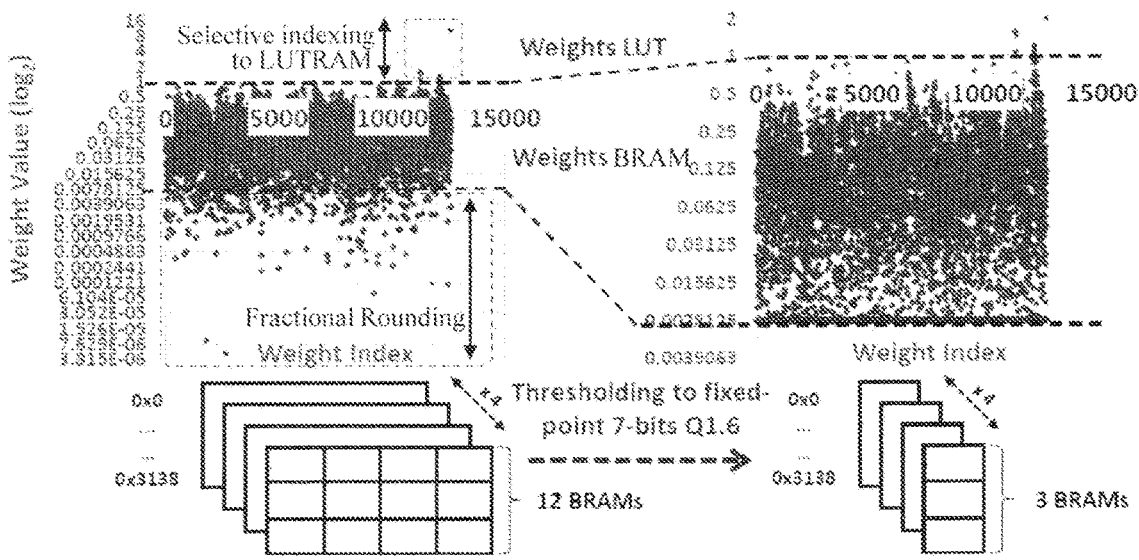
FIG. 9 illustrates reduction of block memory storage requirements for an example of the FIG. 7 method in one embodiment.

FIG. 9 illustrates the saving in BRAM storage requirements using the weight quantization method with selective indexing for an exemplary weight distribution. The initial distribution of weight values is shown on the left of the figure and requires 48 BRAMs for storage of all weights. By thresholding with $B_{TH}$=7 bits to a Q(I–X)·(F–Y)=Q1.6 format for the majority of weights, these weights can be stored in only 12 BRAMs as indicated on the right of the figure. The remaining minority subset of QI·F weights in the set, here weight values greater than 1, are allocated to LUTRAM. The huge memory-resource savings achievable with this method are clearly evident from this example.

Since k weights are stored in each BRAM word with the above method, at least k weights can be accessed in parallel for ANN processing operations. This allows parallel computations to be performed by compute logic of FPGA 30, reducing processing time for computation stages of the network. FPGA BRAMs are typically one- or two-port memories, thus permitting one or two addresses to be read in each clock cycle. The horizontal memory partitioning described above thus enables either k or 2k weights to be processed in parallel according to the number of BRAM ports. This number can be increased further by vertical partitioning of the set of BRAMs storing the weights for a layer. Vertical partitioning of a set of BRAMS provides a plurality m of parallel BRAMS, whereby a weight for a given layer can be stored in one of the m parallel memories. This allows (k×m), or for two-port memories (2k×m), weights to be accessed in parallel. In step 42 of FIG. 5, the partitioning scheme may define a vertical partitioning of the BRAM set for the weights associated with one or more ANN layers. The weights will then be stored in m parallel BRAMs for that layer, and the FPGA compute logic can be configured to process the weights accordingly, performing up to (k×m) or (2k×m) parallel computations for that layer. The number of parallel computations may depend on a specified loop unroll factor discussed further below.

With the BRAM partitioning schemes described, each weight can be assigned to one of k positions in a horizontally-partitioned BRAM address, and possibly to one of m vertically partitioned BRAMs. The partitioning scheme for a given layer's weight set defines an interleave factor for cyclic interleaving of weights in BRAM addresses on the horizontally- (and where appropriate vertically-) partitioned plane. The cyclic interleave factor is determined in dependence on the ANN's access patterns, i.e. the interconnections between neuron layers in the network. A fully-connected network has a sequential access pattern since all neurons in one layer are connected to a given neuron in the next. With a bi-element access pattern, every second neuron in a given layer is connected to a given neuron in the next. Numerous other access patterns are of course possible, and in general the interleave factor for a given layer's weights is defined according to the interconnections between that layer and the next layer. The weights are then cyclically interleaved in the BRAM addresses in accordance with the interleave factor so that the appropriate weights are accessed from these addresses for a given computation stage. With interleave factor=1, weights are interleaved sequentially in BRAM words; with interleave factor=2, every second weight is interleaved in a BRAM word, and so on.

In embodiments, quantization and BRAM partitioning is also performed for ANN input data. The FIG. 5 method may thus include additional steps for input data, similar to steps 41 and 42 for the weights. In particular, embodiments of methods define an input data format for quantizing input data samples to be processed by the neural network. Such methods then define a further partitioning scheme for a further set of BRAMS to which input data samples will be loaded at runtime. This partitioning scheme allows a plurality of input data samples to be accessed in parallel, from horizontally and/or vertically partitioned BRAMs, as described for the weights. The resulting partitioned memory set is then configured in FPGA 30 on programming. The quantized input data format may be determined via simulation of the effect of different formats on model accuracy in a similar manner to quantization formats for weights. The particular partitioning scheme for the input data BRAMS will then depend on bit-width of the input data format, and can be adapted to accommodate the number of weights to be processed in parallel in a computation stage involving the input data.

Figure 10:
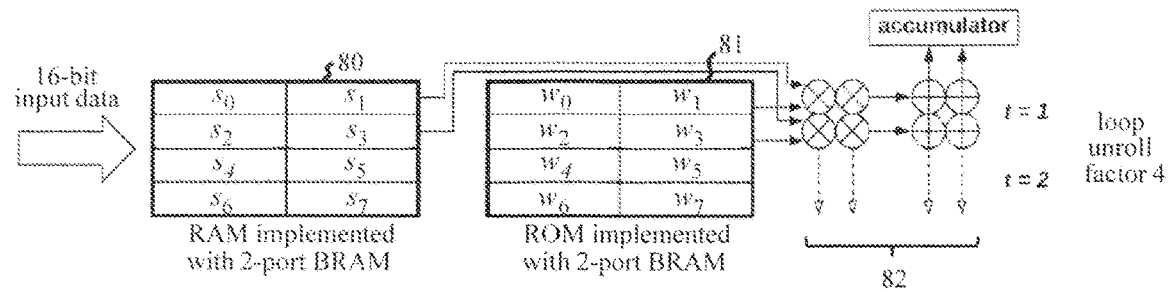
FIG. 10 shows an exemplary block memory partitioning for weights and input data in a computation stage of a programmed FPGA embodying the invention in one embodiment.
Figure 11:
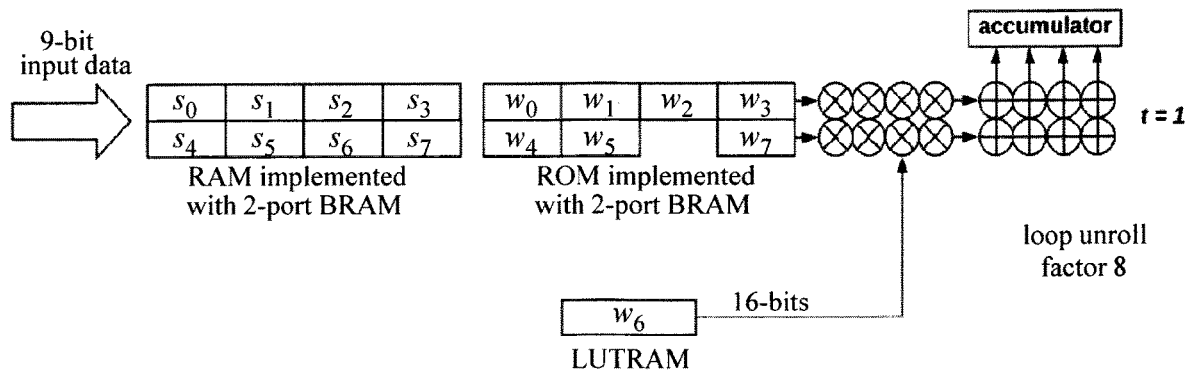
FIG. 11 shows an exemplary computation stage with the FIG. 7 quantization method in one embodiment.
Figure 12:
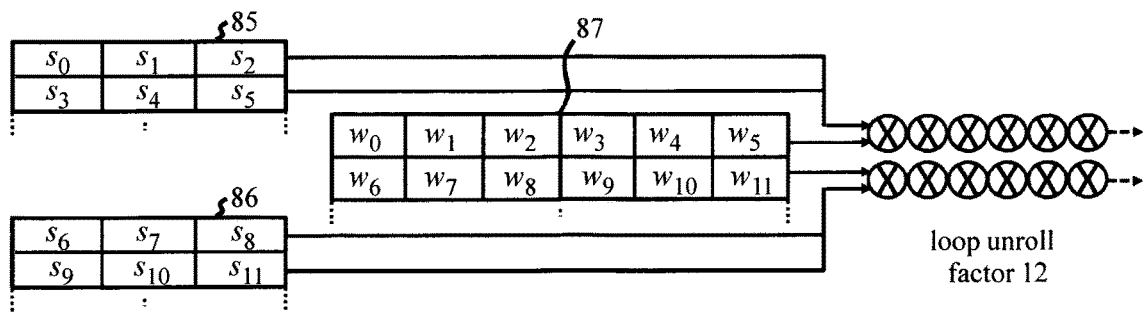
FIG. 12 shows an exemplary computation stage with horizontally and vertically partitioned block memories in one embodiment.

FIG. 10 shows an exemplary partitioning scheme for weight and input data BRAMS illustrating parallelization of a computation stage achieved via the partitioning. Here, a horizontally-partitioned (H-partitioned) input data RAM 80 stores two 16-bit input data samples, denoted by $s_0$, $s_1$, $s_2$, . . . etc., per address. An H-partitioned ROM 81 stores two weights $w_0$, $w_1$, $w_2$, . . . etc., per address. Parallel circuits 82 are instantiated in the FPGA compute logic to enable parallel multiply-accumulate operations, in each clock cycle t, for four product terms $s_i \times w_{ij}$ of the dot product computation illustrated in FIG. 3. The computational loop for this dot product computation, comprising a total of $l_1$ products in FIG. 3, is thus unrolled by a factor of 4, with a consequent increase in processing speed. FIG. 11 shows another example employing the selective indexing of weights to LUTRAM. Here, four 9-bit input samples are stored in each H-partitioned data RAM address, and four 9-bit weights are stored in each H-partitioned ROM address. One 16-bit weight $w_6$ is stored in LUTRAM. In this example, the compute logic is configured to implement eight product terms $s_i \times w_{ij}$ in parallel (loop unroll factor=8). FIG. 12 shows a further example with vertical-partitioning (V-partitioning) of input data RAMs. Here, two parallel data RAMS 85, 86 are each H-partitioned to store three data samples per address. An H-partitioned ROM stores six weights per address. The compute logic (only partially shown here) is configured to perform multiply-accumulate operations for twelve product terms $s_i \times w_{ij}$ in parallel (loop unroll factor=12).

Figure 13:
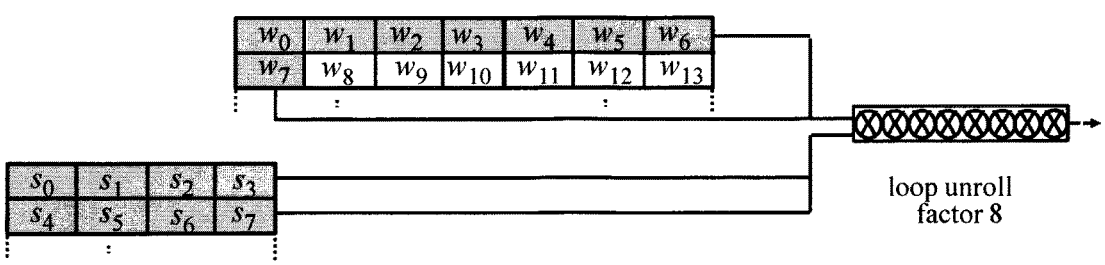
FIGS. 13 and 14 illustrate computation stages accommodating different loop unroll factors in embodiments.
Figure 14:
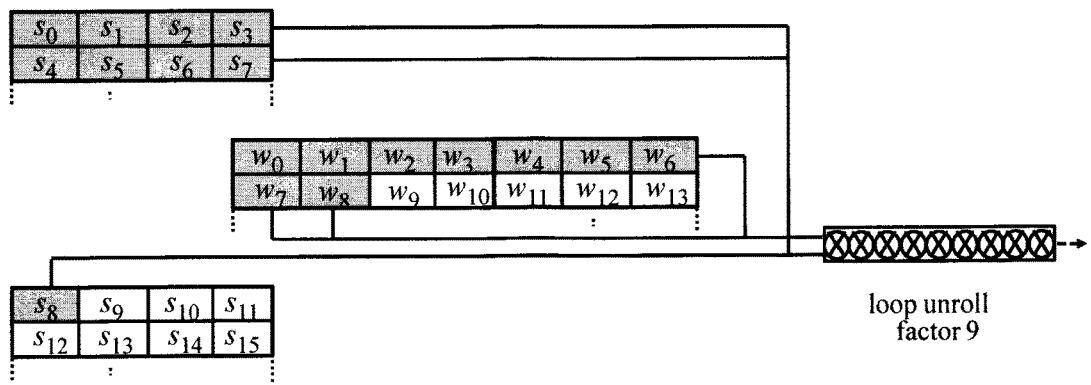

In general, through configuration of the required parallel logic in FPGA 30, loops of dot product computations can be unrolled with any factor within the capabilities of the improved parallel access provided via H/V-partitioning of the BRAMS. FIGS. 13 and 14 provide illustrative examples for different loop unroll factors r. In FIG. 13, a loop unroll factor r=8 is achieved by loading only (shaded) weights $w_0$ to $w_7$ (of the fourteen weights $w_0$ to $w_{13}$ that could be accessed in parallel) to the parallel compute circuits, along with data samples $s_0$ to $s_7$. In FIG. 14, a loop unroll factor r=9 is achieved by loading weights $w_0$ to $w_8$ to parallel compute circuits, along with data samples $s_0$ to $s_8$ from two V-partitioned data RAMs. In some embodiments, respective loop unroll factors r are defined for one or more such dot product computations in a computation stage of each neuron layer. When programming the FPGA, parallel logic is configured to implement multiply-accumulate operations for r products $s_i \times w_{ij}$ of the corresponding dot product computation in parallel. Unrolling of loops, and parallel logic configuration, can be similarly implemented for higher-level loops. In some embodiments, loops of matrix-vector and/or matrix-matrix computations, each of which involves multiple dot-product loops, are similarly unrolled. For each such computation stage involving a plurality of dot product computations, a respective further loop unroll factor q can be defined so that, on programming the apparatus, the FPGA logic is configured to implement q of the dot product computations in parallel. This provides further levels of parallelization in the compute logic for increased processing efficiency. The various loop unroll factors r, q can be selected as appropriate for different computations/layers, e.g. by an optimizer, to achieve an optimal implementation efficiency based on available FGPGA resources.

Additional pipelining and dataflow optimization techniques can be implemented in generally known manner to allow continuous processing of parallel computations/higher-level network tasks to further improve performance. For example, FPGA 30 can be configured to pipeline computation stages for dot product/matrix-vector/matrix-matrix computations, with dataflow optimization implemented for more course-grained network tasks for additional performance gains. Such pipelining/dataflow optimization techniques are well known in the art, and appropriate implementations for specific neural networks will be apparent to those skilled in the art.

Computational efficiency may be further enhanced in some embodiments by defining approximated output values of the activation functions defined for neuron layers in the ANN model. On programming FPGA 30, these approximated output values can then be stored in the form of fixed-point lookup tables in persistent memory (configured in BRAM 34 or LUTRAM registers 35) to reduce computational complexity. However, alternative embodiments may implement approximated activation functions in other ways, e.g. by implementing a piecewise linear function, rectified linear unit, truncated power function, softplus function, etc., in FPGA 30.

Figure 15:
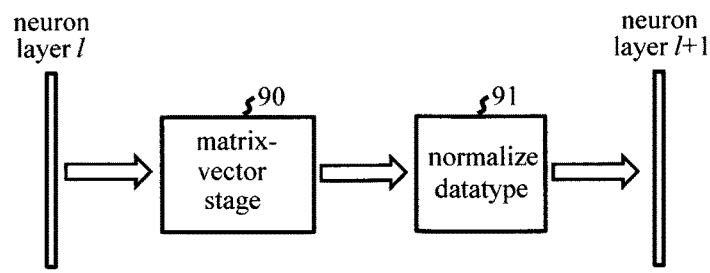
FIG. 15 illustrates precision-adjustment for the output of a computation stage in one embodiment.

With the transprecision weights described above, the FPGA can be configured to perform computations with different precisions across the computational progress of the network, providing transprecision ANN computation. FPGAs can support off-the-shelf combinations of different fixed-point formats in computation. FPGA 30 can thus be configured to accommodate the transprecision weights, along with different precisions for data along the execution pipeline of the ANN. Higher precision may be required for some computation stages (e.g. multiply-accumulate operations for the first neuron layer), while lower precision can be adopted for others (e.g. max pooling and neuron activation functions) without compromising ANN performance. Different precision may also be required for the same computation type in different layers (e.g. multiply-accumulate operations for the first layer and multiply-accumulate operations for a subsequent layer). In some embodiments, therefore, the FPGA configuration method includes a step of defining, for each of a plurality of computation stages for signals transmitted through the network, a normalized data format for an output of that stage. When programming FPGA 30, the FPGA logic is then configured to normalize the output of each stage to the normalized data format defined for that stage. FIG. 15 shows an example of a computation stage comprising a matrix-vector computation 90 to compute the outputs from a neuron layer l to the next layer l+1. Computation stage 90 is implemented with sufficiently high precision to accommodate the data formats of the weights w and data signals s at the input to this stage. However, a normalization stage 91 then normalizes the output signals from stage 90 to a reduced-precision (lower bit-width) datatype for output to the next neuron layer. Such a normalization stage can be implemented, for example, by a division stage. Normalization may in general be performed as part of a particular computation stage, or performed separately after a number of computation stages. In general, the computation stages for which a reduced-precision output datatype is defined may be computations associated with individual neuron layers and/or computations performed over two or more neuron layers. Some embodiments may define such a normalized data format for an output of at least a last computation stage of each neuron layer. This datatype adjustment allows different precision to be employed for communication and processing along the execution pipeline of the ANN, providing a datapath with precision-adjusted datatypes across the computational progress.

Figure 16:
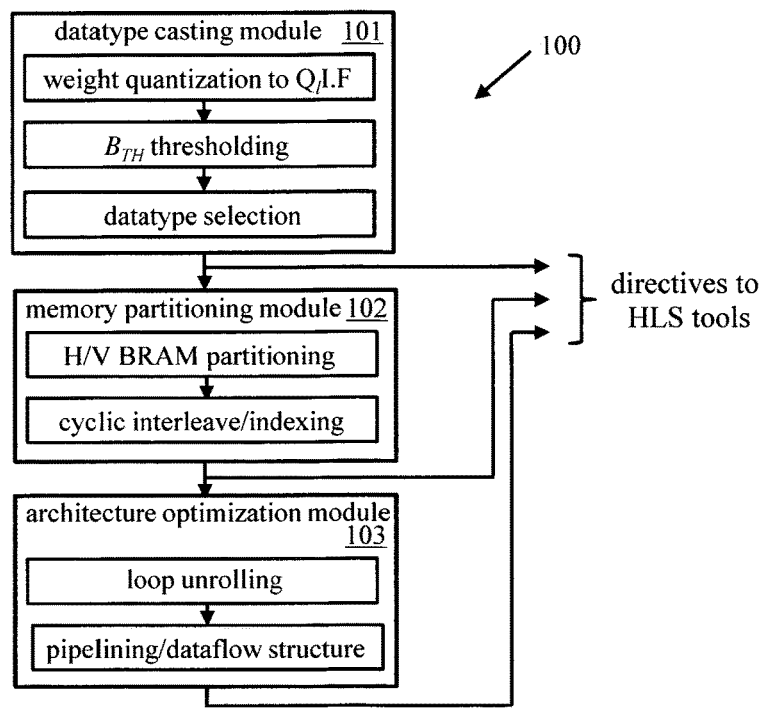
FIG. 16 illustrates component modules of a system for implementing FPGA configuration methods in an embodiment of the invention.

FIG. 16 is a schematic representation of component modules, e.g. program modules, in an exemplary computing system for implementing a method as described above. The system 100 of this embodiment comprises a datatype casting module 101, a memory partitioning module 102, and an architecture optimization module 103. Datatype casting module 101 performs the weight quantization to fixed-point $Q_I \cdot F$ for each layer, and determines the optimum threshold $B_{TH}$ for selective indexing of weights to LUTRAM for each layer. Based on the quantized weight format, this module then determines appropriate datatypes for input data and various stages of the computational datapath of the ANN. The resulting operational parameters determined by datatype casting module 101 are input to modules 102 and 103 for subsequent optimization steps.

Memory partitioning module 102 optimizes the H/V partitioning of input data BRAMs and the weight BRAMs for each network layer. This module also determines the mapping of weights to memory locations according to the ANN access patterns for each layer. The resulting parameters, defining the memory partitioning and indexing requirements, are input to architecture optimization module 103. This module 103 then optimizes the loop unrolling, pipelining and dataflow implementation for the ANN hardware architecture. The output parameters of this module, along with those of modules 101 and 102, provide a set of directives to be applied by the HLS tools for implementing the ANN model. Such directives may, for example, be encoded as "pragmas" which supplement the program model supplied to the HLS tools. The program model may be annotated with appropriate pragmas, which will then be interpreted by the HLS tools to implement the required directives. The precise form of such pragmas varies for different HLS tools, but an illustrative example is shown in FIG. 17. This example shows pragmas annotating a segment of program code for a dot product computation. The basic dot product computation is shown in the upper box of the figure. The additions to the code in the lower box define quantized datatypes and partitioned memory structures for a partitioned memory arrangement shown partially in FIG. 14, with a loop unroll of 9. The example shown gives only a portion of the code for a more complex partitioning structure, but demonstrates the basic concept of using pragmas to implement optimization directives. (Note also that datatypes are defined in a format <W,I> here, where I=number of integer bits as for the QI·F format used previously, and W=total bit-width, i.e., W=I+F (+1 optional sign bit) in the previous notation). In this example, the ap_fixed type of the Vivado HLS toolset is used, so an extra bit denotes the sign).

In general, the component modules of system 100 may perform fully- or semi-automated processing operations to implement the required functionality, and may be responsive to operator input of particular constraints/operating criteria for use in the various optimization stages. Functionality may also be allocated differently between component modules, and functionality of one or more modules may be combined.

It will be seen that the foregoing methods offer highly efficient implementations of FPGA-based persistent ANNs, with enhanced BRAM bandwidth and transprecision memory, datapath and computation stages for optimizing use of FPGA resources.

It will be of course appreciated that various changes and modifications can be made to the exemplary embodiments described above. For example, while weights are quantized to fixed point formats in the above examples, other reduced-precision formats, with lower bit-width than full-precision model weights, may be utilized. Examples include non-IEEE floating point (custom X-bit with arbitrary number of mantissa-exponent bits), logarithmic number system (LNS), Flexpoint, and unum (universal number) formats.

In general, where features are described herein with reference to methods embodying the invention, corresponding features may be provided in apparatus/computer program products embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of configuring field-programmable gate array apparatus to implement an artificial neural network having a succession of interconnected neuron layers and a plurality of sets of weights, each associated with a respective neuron layer, for weighting output signals of those neuron layers, the method comprising:
   processing a trained model of the neural network, in which said weights are defined in a floating-point format, to quantize each set of weights to a respective reduced-precision format in dependence on effect of the quantization on accuracy of the model, wherein quantization is performed for each layer of the neuron layers as a progressive process in dependence on contribution of that layer to overall precision of the model;
   for each set of weights, defining a partitioning scheme for a set of block memories of said apparatus such that a plurality k of those weights can be stored in each addressable location of the set of memories, wherein k differs for different sets of weights; and
   programming said apparatus to implement the neural network such that weights in each set are persistently stored in a set of said block memories partitioned according to said partitioning scheme for that set of weights, wherein,
   after quantizing each set of weights to said reduced-precision format:
   selecting a minority subset of that set comprising weights whose values exceed a threshold bit-width for that set;
   defining said partitioning scheme in dependence on said threshold bit-width such that a plurality of weights in the remaining, majority subset of that set can be stored in each said addressable location; and
   in programming said apparatus, storing said majority subset of the weights in said set of partitioned block memories and storing said minority subset of the weights in a set of registers of the apparatus,
   wherein the threshold bit-width for that set is defined based on a clustering optimization performed on that set.

2. A method as claimed in claim 1 including, in said partitioning scheme for each set of weights associated with a respective neuron layer, defining an interleave factor for cyclic interleaving of weights in the addressable locations of said set of block memories in dependence on interconnections between that neuron layer and a next neuron layer in the network; and
   in programming said apparatus, cyclically interleaving weights in said set of block memories in accordance with said interleave factor.

3. A method as claimed in claim 1 wherein, for the set of weights associated with at least one neuron layer:
   said partitioning scheme defines a vertical partitioning of said set of block memories such that a weight associated with that layer can be stored in one of a plurality of parallel block memories; and
   in programming said apparatus, storing weights associated with that layer in said plurality of parallel block memories.

4. A method as claimed in claim 1 including quantizing each set of weights to a respective fixed-point format.

5. A method as claimed in claim 4, including obtaining the fixed-point format for each set of weights by:
   providing sufficient integer bits in the fixed-point format to accommodate integer bits of all of those weights; and
   progressively rounding fractional bits of those weights up to a predetermined threshold for accuracy degradation of the model.

6. A method as claimed in claim 1 including:
   defining an input data format for quantizing input data samples to be processed by the neural network;
   defining a further partitioning scheme for a further set of block memories of said apparatus such that a plurality of input data samples can be accessed in parallel from said further set of memories; and
   in programming the apparatus, configuring said further set of block memories for receiving input data samples in accordance with said further partitioning scheme.

7. A method as claimed in claim 1 wherein said model defines a plurality of computation stages for signals transmitted through the network via said neuron layers, the method including:
   defining, for each computation stage, a normalized data format for an output of that stage; and
   in programming the apparatus, configuring logic of the apparatus to normalize said output of each stage to said normalized data format for that stage.

8. A method as claimed in claim 1 wherein said model defines at least one computation stage for each said respective neuron layer, the method including:
defining, for at least a last computation stage of each of those layers, a normalized data format for an output of that stage; and
in programming the apparatus, for each computation stage for which a said normalized data format is defined, configuring logic of the apparatus to normalize the output of that computation stage to said normalized data format for that stage.

9. A method as claimed in claim 1 wherein said model defines, for each set of weights associated with a respective neuron layer, a computation stage comprising at least one dot product computation $s \cdot w = \Sigma_{i=1}^{l}(s_i \times w_{ij})$ where s is a vector of said output signals $s_i$ of that neuron layer and w is a vector of weights $w_{ij}$ in said set, the method including:
defining a loop unroll factor r for said dot product computation; and
in programming the apparatus, configuring logic of the apparatus to implement multiply-accumulate operations for r products $s_i \times w_{ij}$ of the dot product computation in parallel.

10. A method as claimed in claim 9 wherein said computation stage comprises a plurality of said dot product computations, the method including:
defining a further loop unroll factor q for said plurality of dot product computations; and
in programming the apparatus, configuring logic of the apparatus to implement q of said dot product computations in parallel.

11. A method as claimed in claim 1 wherein said model defines activation functions for computing said output signals of respective neuron layers, the method including:
defining approximated output values of said activation functions for the neuron layers; and
in programming the apparatus, storing said approximated output values in persistent memory of the apparatus.

12. A field-programmable gate array apparatus comprising logic configured to implement an artificial neural network having a succession of interconnected neuron layers and a plurality of sets of weights, each associated with a respective neuron layer, for weighting output signals of those neuron layers, wherein:
said logic is configured to process each set of weights in dependence on a respective data format defined for that set, wherein quantization is performed for each layer of the neuron layers as a progressive process in dependence on contribution of that layer to overall precision of the model; and
said logic includes, for each set of weights, a set of block memories partitioned according to a partitioning scheme for that set of weights such that a plurality k of those weights are persistently stored in each addressable location of the set of memories, wherein k differs for different sets of weights, wherein
said logic includes, for each set of weights, a set of registers storing a minority subset of the weights whose values exceed a threshold bit-width for that set; and
said partitioning scheme for each set of weights is adapted, in dependence on said threshold bit-width for that set, such that a plurality of weights in the remaining, majority subset of the weights are stored in each said addressable location of the set of block memories, wherein the threshold bit-width for that set is defined based on a clustering optimization performed on that set.

13. The apparatus as claimed in claim 12 wherein, for each set of weights associated with a respective neuron layer, the weights stored in said set of block memories are cyclically interleaved with an interleave factor dependent on interconnections between that neuron layer and a next neuron layer in the network.

14. The apparatus as claimed in claim 12 wherein a respective fixed-point format is defined for each set of weights.

15. The apparatus as claimed in claim 12 wherein:
said logic includes a further set of block memories for receiving input data samples to be processed by the neural network; and
said further set of memories is partitioned according to a further partitioning scheme, dependent on a predefined data format for input data, such that a plurality of input data samples can be accessed in parallel from said further set of memories.

16. The apparatus as claimed in claim 12 wherein:
said logic is configured to implement a plurality of computation stages for signals transmitted through the network via said neuron layers; and
for each computation stage, said logic is configured to normalize an output of that stage to a respective normalized data format for that stage.

17. A computer program product for configuring field-programmable gate array apparatus to implement an artificial neural network having a succession of interconnected neuron layers and a plurality of sets of weights, each associated with a respective neuron layer, for weighting output signals of those neuron layers, said computer program product comprising a computer readable storage medium having program instructions embodied therein, the program instructions being executable by a computing system to cause the computing system:
to process a trained model of the neural network, in which said weights are defined in a floating-point format, to quantize each set of weights to a respective reduced-precision format for that set in dependence on effect of the quantization on accuracy of the model, wherein quantization is performed for each layer of the neuron layers as a progressive process in dependence on contribution of that layer to overall precision of the model;
for each set of weights, to define a partitioning scheme for a set of block memories of said apparatus such that a plurality of those weights can be stored in each addressable location of the set of memories; and
to program said apparatus to implement the neural network such that weights in each set are persistently stored in a set of said block memories partitioned according to said partitioning scheme for that set of weights,
wherein said program instructions are further executable to cause the computing system, after quantizing each set of weights to said reduced-precision format, to:
select a minority subset of that set comprising weights whose values exceed a threshold bit-width for that set;
define said partitioning scheme in dependence on said threshold bit-width such that a plurality of weights in the remaining, majority subset of that set can be stored in each said addressable location; and
in programming said apparatus, to store said majority subset of the weights in said set of partitioned block memories and store said minority subset of the weights in a set of registers of the apparatus, wherein the threshold bit-width for that set is defined based on a clustering optimization performed on that set.

\* \* \* \* \*